(12) United States Patent
Nagaoka

(10) Patent No.: US 12,487,283 B2
(45) Date of Patent: Dec. 2, 2025

(54) INFORMATION PROCESSING APPARATUS AND INFORMATION PROCESSING METHOD

(71) Applicant: FUJIFILM Business Innovation Corp., Tokyo (JP)

(72) Inventor: Tsutomu Nagaoka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 533 days.

(21) Appl. No.: 17/874,294

(22) Filed: Jul. 27, 2022

(65) Prior Publication Data

US 2023/0314507 A1 Oct. 5, 2023

(30) Foreign Application Priority Data

Mar. 29, 2022 (JP) ................. 2022-053548

(51) Int. Cl.
*G01R 31/3177* (2006.01)
*G01R 31/317* (2006.01)
*G01R 31/3185* (2006.01)

(52) U.S. Cl.
CPC ... *G01R 31/3177* (2013.01); *G01R 31/31705* (2013.01); *G01R 31/318519* (2013.01)

(58) Field of Classification Search
CPC .......... G01R 31/3177; G01R 31/31705; G01R 31/318519
See application file for complete search history.

(56) References Cited

U.S. PATENT DOCUMENTS

| 9,678,150 | B2 | 6/2017 | Schelle et al. | |
| 10,482,205 | B2 | 11/2019 | Mahajan et al. | |
| 2007/0180315 | A1* | 8/2007 | Aizawa | G06F 11/1438 714/15 |
| 2023/0314507 | A1* | 10/2023 | Nagaoka | G01R 31/318519 714/725 |
| 2023/0315961 | A1* | 10/2023 | Sasaki | G06F 30/343 716/101 |

FOREIGN PATENT DOCUMENTS

| JP | 6653756 | 2/2020 |
| JP | 2020529064 | 10/2020 |

* cited by examiner

*Primary Examiner* — John J Tabone, Jr.
(74) *Attorney, Agent, or Firm* — JCIPRNET

(57) ABSTRACT

An information processing apparatus includes an integrated circuit that is capable of reconfiguring a logic circuit, that executes data processing, and that is capable of acquiring signal data from an acquisition target position set in a circuit portion where the data processing is performed and outputting the signal data, a change unit that changes the acquisition target position in the circuit portion where the data processing of the integrated circuit is performed in a case where an error is generated in the data processing of the integrated circuit, and a control unit that causes the integrated circuit to re-execute the data processing in which the error is generated, after the acquisition target position is changed.

10 Claims, 6 Drawing Sheets

INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2022-053548 filed Mar. 29, 2022.

BACKGROUND

(i) Technical Field

The present invention relates to an information processing apparatus and an information processing method.

(ii) Related Art

In order to perform analysis and debugging of an internal operation of a field programmable gate array (FPGA), signals between elements inside the FPGA are extracted and analyzed by using a logic analyzer.

JP2020-529064A discloses a configuration of monitoring a probe target signal of an integrated circuit by using a logic analyzer circuit that is mounted in the integrated circuit to detect changes in a state of the probe target signal and generating a file that designates changes in a state in which the probe target signal is time stamped.

SUMMARY

In a case where a logic analyzer is mounted on the FPGA and the internal state of the FPGA is analyzed by using the logic analyzer, since the number of signals that can be extracted from the FPGA and the time width are limited, the signals necessary for the analysis cannot be obtained.

Aspects of non-limiting embodiments of the present disclosure relate to an information processing apparatus, an integrated circuit, and an information processing method that are capable of acquiring a signal necessary for analysis depending on an abnormality that has occurred as compared with a configuration in which a signal is acquired from a fixedly set location of a circuit in the FPGA.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an integrated circuit that is capable of reconfiguring a logic circuit, that executes data processing, and that is capable of acquiring signal data from an acquisition target position set in a circuit portion where the data processing is performed and outputting the signal data, a change unit that changes the acquisition target position in the circuit portion where the data processing of the integrated circuit is performed in a case where an error is generated in the data processing of the integrated circuit, and a control unit that causes the integrated circuit to re-execute the data processing in which the error is generated, after the acquisition target position is changed.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Configuration of System

The present exemplary embodiment is applied to an information processing apparatus that includes an FPGA. The information processing apparatus to be applied may be an apparatus having an FPGA as a processor, and the type of the apparatus is not particularly limited. Hereinafter, a case where an image forming apparatus is used as an example of the information processing apparatus will be described.

Configuration of Apparatus

Figure 1:
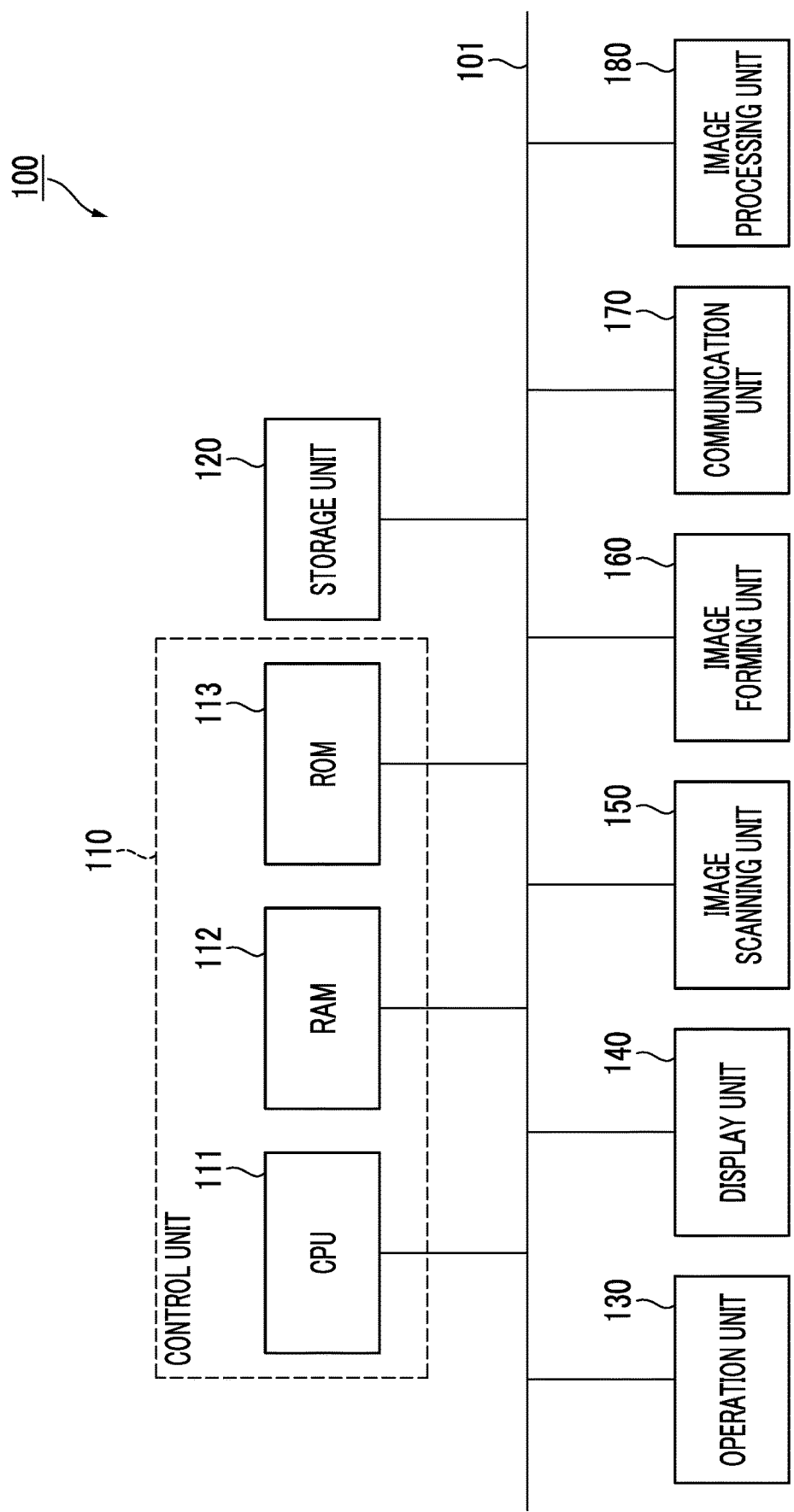
FIG. 1 is a diagram showing an example of a configuration of an image forming apparatus to which the present exemplary embodiment is applied.

FIG. 1 is a diagram showing a configuration of the image forming apparatus to which the present exemplary embodiment is applied. The image forming apparatus 100 includes a control unit 110, a storage unit 120, an operation unit 130, a display unit 140, an image scanning unit 150, an image forming unit 160, a communication unit 170, and an image processing unit 180. Each of these functional units is connected to a bus 101 and performs reception of data via the bus 101.

The control unit 110 controls each of the above-mentioned functional units in the image forming apparatus 100. Further, the control unit 110 is a functional unit that executes various data processing. The control unit 110 includes a central processing unit (CPU) 111 which is a calculator, and a random access memory (RAM) 112 and a read only memory (ROM) 113 which are memories. The RAM 112 is a main storage device (main memory) and is used as a working memory in a case where the CPU 111 performs calculation processing. Data such as a program or a set value prepared in advance is stored in the ROM 113, and the CPU 111 directly reads the program or the data from the ROM 113 and executes processing. Further, the program or data is also stored in the storage unit 120. The CPU 111 reads the program stored in the storage unit 120 into the RAM 112 and executes the program.

In the present exemplary embodiment, the CPU 111 of the control unit 110 reads and executes the program to implement various functions described later. Functions that are implemented in the present exemplary embodiment include determination of the type of error generated in processing by the FPGA device, selection of configuration data of the FPGA according to the content of the error, reconfiguration of the FPGA, and the like. Further, as will be described in detail later, in a case where an error is generated in certain processing, the control unit 110 repeatedly executes the processing in which the error is generated and acquires logs.

The storage unit 120 is a functional unit that stores the program or data for the CPU 111 to execute as described above and also stores various data, which is generated by various operations, such as image data scanned by an image scanning unit 150. The storage unit 120 is implemented by, for example, a storage device such as a magnetic disk device or a solid state drive (SSD).

The operation unit 130 is a functional unit that receives a user operation. The operation unit 130 is configured with, for example, a hardware key, a touch sensor that outputs a control signal according to a position pressed or touched by a finger, or the like. The operation unit 130 may be configured as a touch panel in which a touch sensor and a liquid crystal display constituting the display unit 140 are combined.

The display unit 140 is a functional unit that displays an information image that presents various information to a user, a preview image of an image to be processed such as scanning or outputting, an operation image for the user to perform an operation, and the like. The display unit 140 is configured with, for example, a liquid crystal display. The operation unit 130 and the display unit 140 can be combined and used as a user interface for the user to input and output information to and from the image forming apparatus 100.

The image scanning unit 150 is a functional unit that optically scans an image on a document. Examples of an image scanning method include a charge coupled device (CCD) method in which the reflected light to light emitted from a light source to a document is reduced by the lens and received by the CCDs, a contact image sensor (CIS) method in which the reflected light to light emitted from a light emitting diode (LED) light source to the document in order is received by the CIS, and the like.

The image forming unit 160 is a functional unit that forms an image based on image data on a medium such as paper by using an image forming material. An example of a method of forming an image on the medium includes an electrophotographic method of using toner as an image forming material and transferring the toner adhering to the photoconductor to a medium to form an image.

The communication unit 170 is a functional unit that transmits and receives a command or data to and from between the communication unit 170 and the external apparatus. An example of the communication unit 170 includes an interface that corresponds to a communication method with the external apparatus. The connection with the external apparatus may be made via a network or may be made via a direct connection. A communication line may be a wired line or a wireless line.

The image processing unit 180 is a functional unit that includes a processor which is a calculator and a working memory, and performs the image processing such as color correction or gradation correction on the image represented by the image data. In the present exemplary embodiment, the assumption is made that the FPGA is used as a processor that implements the function of the image processing unit 180.

Reconfigured System of FPGA Device

Figure 2:
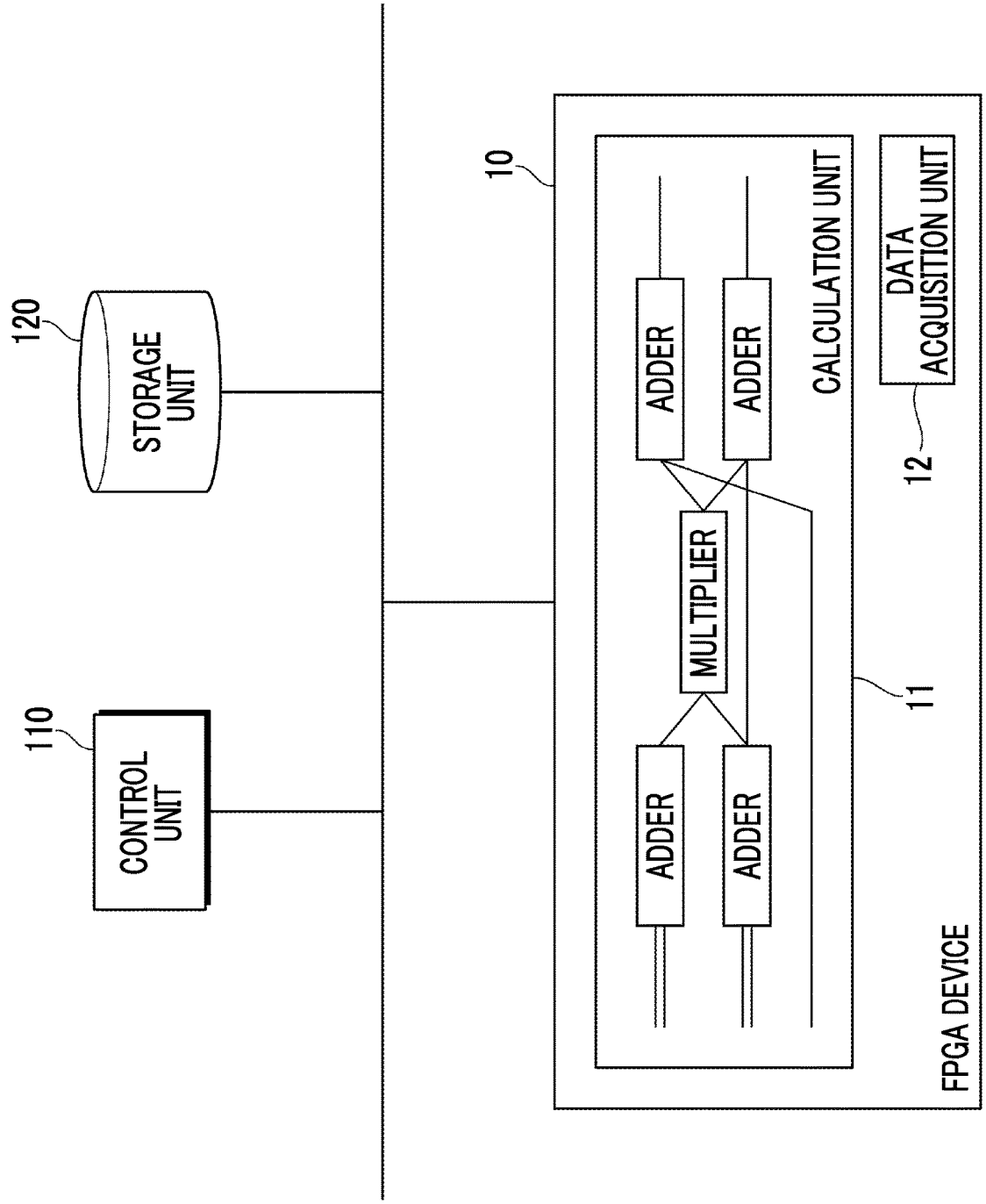
FIG. 2 is a diagram showing a reconfigured system of an FPGA device.

FIG. 2 is a diagram showing a reconfigured system of an FPGA device. The system shown in FIG. 2 is configured to include the FPGA device 10, the control unit 110 in the image forming apparatus 100 shown in FIG. 1, and a storage unit 120. The FPGA device 10 shown in FIG. 2 shows an example of being used as a device for implementing the image processing unit 180 of the image forming apparatus 100. The FPGA device 10 shown in FIG. 2 is an integrated circuit including a calculation unit 11 that executes data processing and a data acquisition unit 12. The control unit 110 controls an operation of the FPGA device 10. The storage unit 120 stores logs output from the FPGA device 10.

The calculation unit 11 is a module or a module group that performs the data processing required for the FPGA device 10. The module of the calculation unit 11 is configured such that various calculation elements or storage elements are combined according to the data processing to be executed. In a case where the FPGA device 10 is applied to the image processing unit 180 of the image forming apparatus 100 shown in FIG. 1, the calculation unit 11 performs, for example, processing such as color conversion, compression or decompression of image data on the image to be processed, or the like. The calculation unit 11 may be divided into a plurality of modules according to the content of the processing.

The data acquisition unit 12 acquires waveform data of a signal transmitted along with the operation of the calculation unit 11 from an acquisition target position set in a circuit of the calculation unit 11. The data acquisition unit 12 has memory (not shown) that temporarily stores the acquired waveform data. Thereafter, the data acquisition unit 12 outputs the waveform data stored in the memory as logs. The output logs of the waveform data are stored in the storage unit 120. The acquisition target position is set for the input or output of the calculation element constituting the calculation unit 11 according to a circuit configuration of the calculation unit 11 and the content of data processing by the calculation unit 11.

The FPGA device 10 is a device in which a circuit for executing specific data processing is configured by writing configuration data. The circuit configuration of the calculation unit 11 and the configuration in which the data acquisition unit 12 acquires the waveform data from the acquisition position are implemented by writing the configuration data to the FPGA device 10.

Further, the FPGA device 10 is an integrated circuit capable of changing the internal circuit configuration by rewriting the configuration data. Here, as a method of changing the circuit configuration, there is a method of setting a specific area in advance and performing partial reconfiguration for this area. The partial reconfiguration does not require a restart of the FPGA device 10 or the image forming apparatus 100 in order to operate the reconfigured circuit, unlike the normal reconfiguration in the FPGA. The FPGA device 10 supports the partial reconfiguration.

The area that is set as a target of the partial reconfiguration in the calculation unit 11 of the FPGA device 10 is called a partial reconfiguration area. One or a plurality of partial reconfiguration areas are set with respect to the calculation unit 11. In the calculation unit 11, one partial reconfiguration area may be set for the entire of one module, or one partial reconfiguration area may be set for a part of one module. Further, one partial reconfiguration area may be set for a module group consisting of a plurality of modules. The acquisition target position for acquiring the waveform data of the signal in the calculation unit 11 is set for each partial reconfiguration area.

Setting of Acquisition Target Position

The setting of the acquisition target position in the calculation unit 11 of the FPGA device 10 will be described.

The data acquisition unit 12 of the FPGA device 10 temporarily stores the acquired waveform data in the memory and then outputs the waveform data as logs. Therefore, the amount of waveform data that the data acquisition unit 12 can temporarily store has an upper limit based on the storage capacity of the memory. On the other hand, in order to analyze the error, a lot of information related to the operation of the calculation unit 11 may be recommended at the time when the error is generated. Therefore, in the present exemplary embodiment, in a case where an error is generated in the operation of the FPGA device 10, the FPGA device 10 outputs the waveform data acquired at the time when the error is generated and then reconfigures the logic circuit of the partial reconfiguration area set in the calculation unit 11 to change the acquisition target position. Thereafter, the FPGA device 10 repeatedly executes the processing in which the error is generated. As a result, each time an error is generated in a case where the processing is repeated, the FPGA device 10 acquires the waveform data at the time when the error is generated from a location different from the partial reconfiguration area and outputs the waveform data.

The change of the acquisition target position by the partial reconfiguration and the re-execution of the processing in which the error is generated are performed by the control of the control unit 110. Specifically, the configuration data, in which the acquisition target position is set in a different location of the calculation unit 11 of the FPGA device 10, is stored in advance in the storage unit 120 or the like, and based on the type of the generated error or the like, the control unit 110 selects the configuration data and causes the FPGA device 10 to perform the partial reconfiguration. Thereafter, the control unit 110 causes the reconfigured FPGA device 10 to re-execute the processing in which the error is generated. The control unit 110 executes the processing in which the error is generated a plurality of times to merge the logs obtained from the FPGA device 10 and stores the logs in the storage unit 120 as one log at the time when an error is generated. The control unit 110 is an example of a change unit.

The control unit 110 re-executes the processing in which the error is generated from a predetermined operation according to the processing performed by the FPGA device 10. For example, the control unit 110 causes the FPGA device 10, as the image processing unit 180 of the image forming apparatus 100, to re-execute the processing in which the error is generated for each unit image (for example, for each page) in an image that is a target of the image processing. The control unit 110 is an example of a control unit.

Further, the reconfiguration of the FPGA device 10 is executed by performing the partial reconfiguration on the partial reconfiguration area. Therefore, the restart of the image forming apparatus 100 is not required in order to complete the reconfiguration of the FPGA device 10. Therefore, the control unit 110 repeatedly executes the processing in which the above-described error is generated while changing the acquisition target position without restarting the image forming apparatus 100 and acquires the logs of the waveform data.

Here, a method of setting the acquisition target position will be described. In a case where an error is generated in the operation of the FPGA device 10, the control unit 110 estimates the suspected location in the calculation unit 11 of the FPGA device 10 based on the content of the generated error. Thereafter, the control unit 110 executes partial reconfiguration of the FPGA device 10 so as to sequentially move the acquisition target position to the preceding side from the suspected location and acquires the logs of the waveform data by repeating the processing in which the error is generated. The reason why the acquisition target position is sequentially moved to the preceding side is that in a case where an error is generated at a certain place of the calculation unit 11, an assumption is made that the cause of the error is a location where the error is generated or the preceding stage of the location.

In a case where the acquisition target position reaches a position at the most preceding stage of the partial reconfiguration area including the suspected location, the control unit 110 then executes the partial reconfiguration by using other configuration data targeting the partial reconfiguration area and acquires the logs of the waveform data by repeating the processing in which the error is generated. Thereafter, in a case where the partial reconfiguration is performed using all the configuration data targeting the partial reconfiguration area that includes the suspected location, the control unit 110 ends the reconfiguration of the FPGA device 10 and the re-execution of the processing in which the error is generated. In a case where a plurality of partial reconfiguration areas are provided in the calculation unit 11 of the FPGA device 10 and there is another partial reconfiguration area adjacent to the preceding side of the partial reconfiguration area that includes the suspected location, the partial reconfiguration may be executed by using the configuration data targeting the other partial reconfiguration area, and the logs of the waveform data may be acquired by repeating the processing in which the error is generated.

Figure 3:
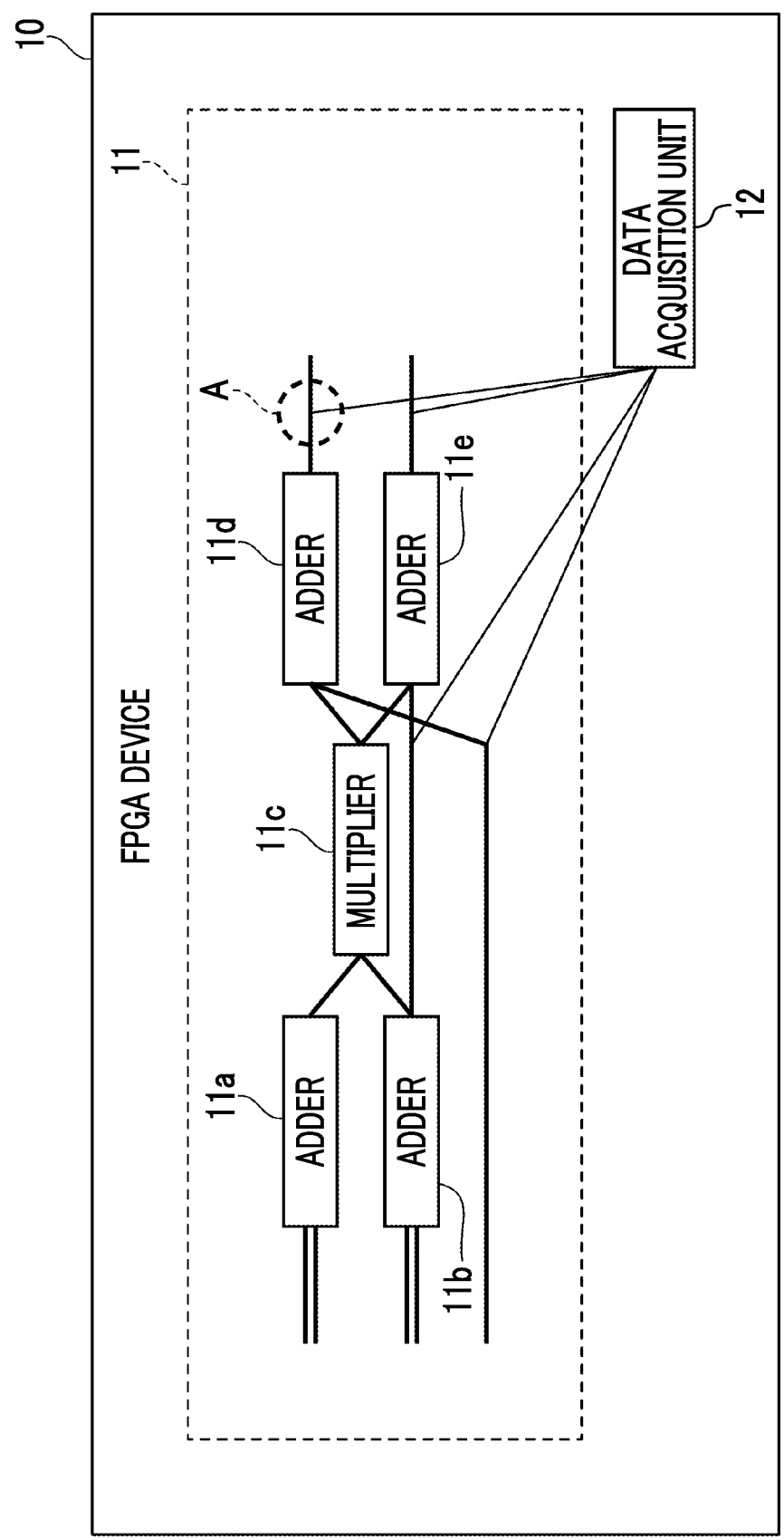
FIG. 3 is a diagram showing an example of an acquisition target position in the FPGA device in an initial state.
Figure 4:
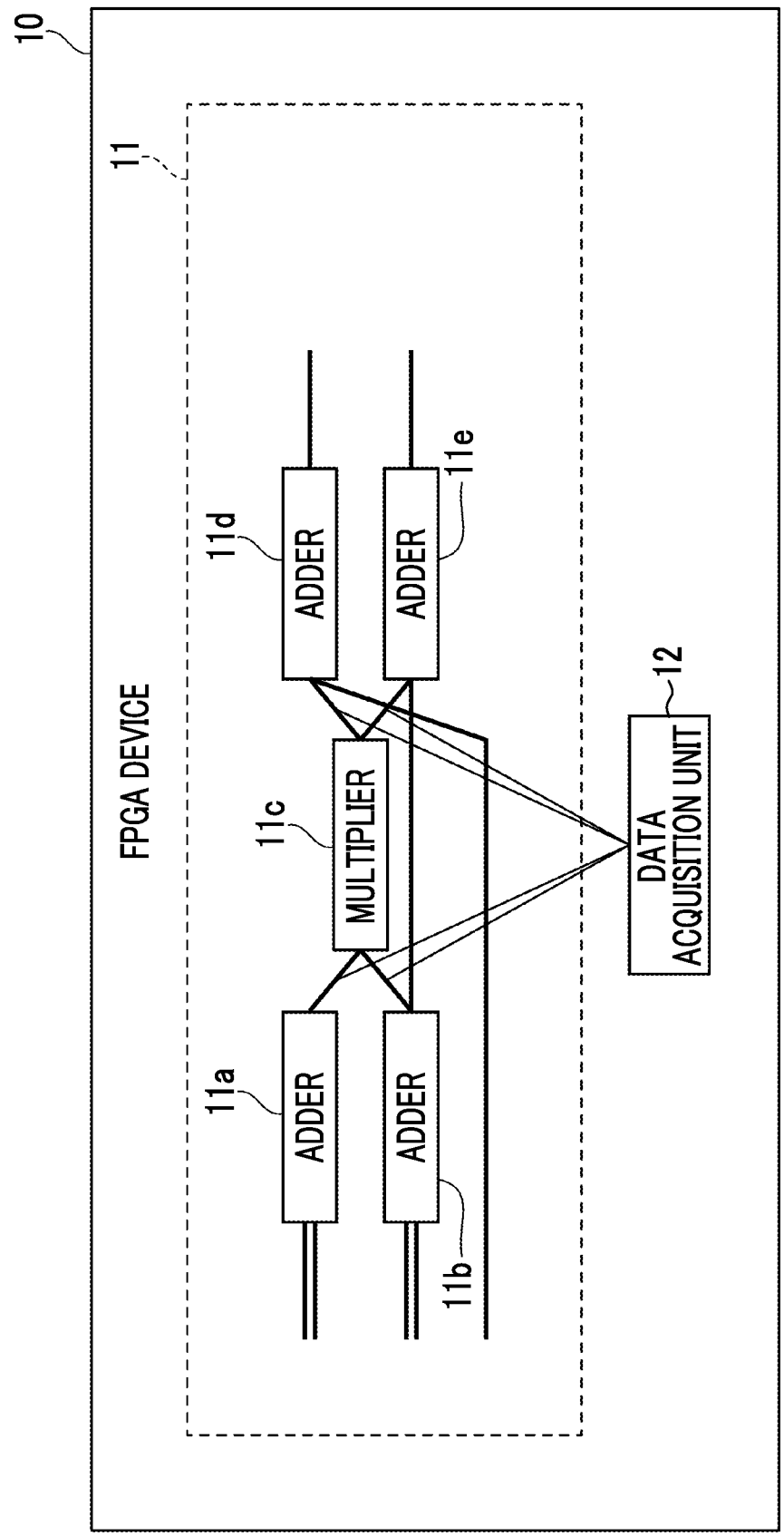
FIG. 4 is a diagram showing an example of the acquisition target position in the FPGA device in a state in which reconfiguration is performed on a calculation unit.
Figure 5:
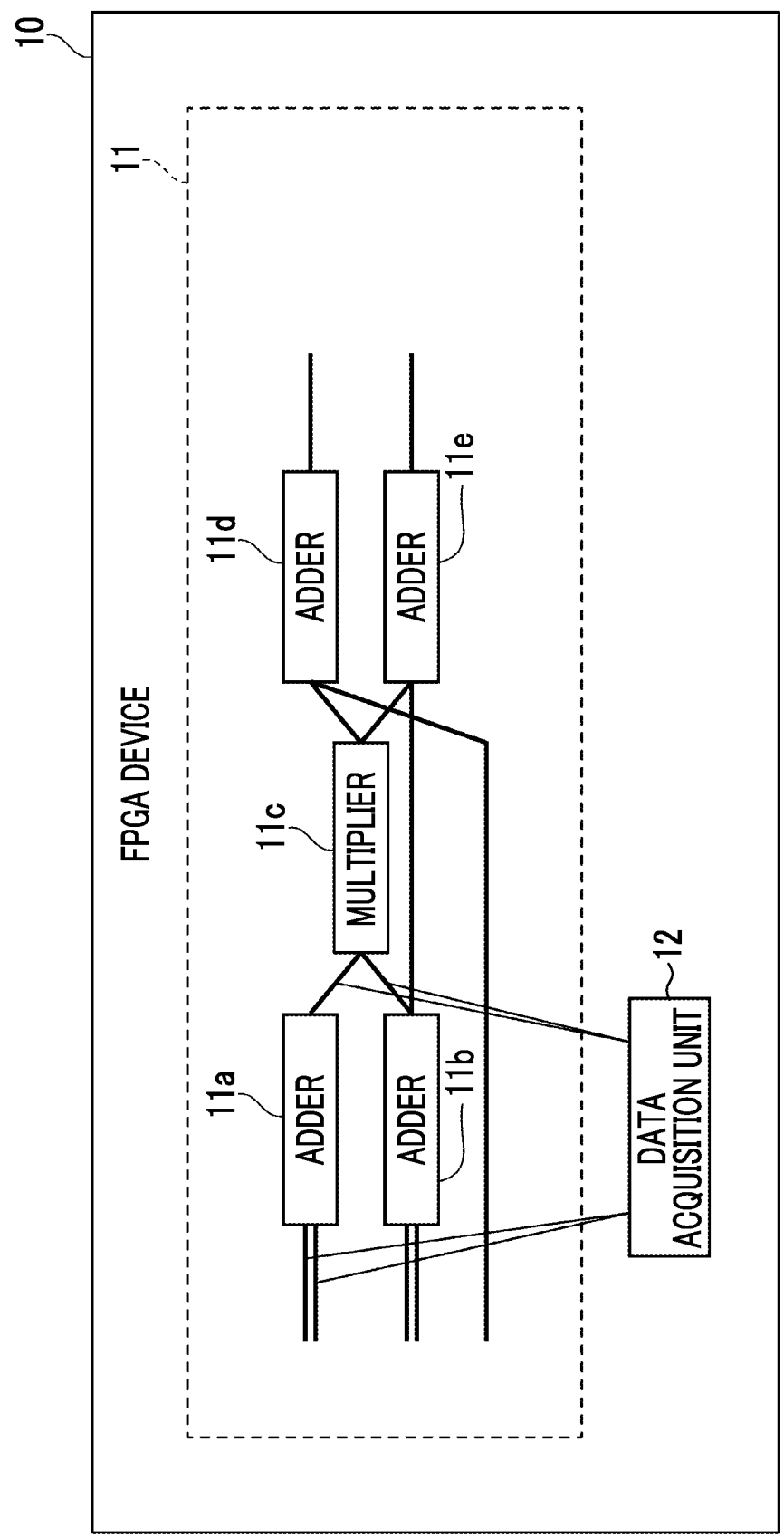
FIG. 5 is a diagram showing an example of the acquisition target position in the FPGA device in a state in which reconfiguration is further performed on the calculation unit.

The setting of the acquisition target position will be further described with reference to FIGS. 3 to 5. The calculation unit 11 of the FPGA device 10 shown in FIGS. 3 to 5 includes a processing path including an adder 11a, an adder 11b, a multiplier 11c, an adder 11d, and an adder 11e. An assumption is made that the illustrated portion of the calculation unit 11 is included in one partial reconfiguration area. FIGS. 3 to 5, FIG. 3 shows the FPGA device 10 in the initial state, FIG. 4 shows the FPGA device 10 in a state in which the reconfiguration (movement of the acquisition target position) of the calculation unit 11 is performed, and FIG. 5 shows the FPGA device 10 in a state in which the reconfiguration (movement of the acquisition target position) of the calculation unit 11 is further performed.

An assumption is made that the calculation unit 11 of the FPGA device 10 shown in FIG. 3 detects an error in which the output of the adder 11d (position A in FIG. 3) is defined as the suspected location. In the initial state shown in FIG. 3, the acquisition target positions are four positions of an input from other than the multiplier 11c among the two inputs to the adder 11d, an output of the adder 11d, an input from the adder 11b among the two inputs to the adder 11e, and an output of the adder 11e. Therefore, the waveform data of four signals are acquired from the acquisition target positions.

In the example shown in FIG. 3, the suspected location of the generated error is included in the acquisition target position. The control unit 110 moves the acquisition target positions to the preceding side of the positions shown in FIG. 3 by using the partial reconfiguration. In the state shown in FIG. 4 in which the partial reconfiguration is performed, the acquisition target positions are four positions of two inputs to the multiplier 11c from the adders 11a and 11b, and two outputs to the adders 11d and 11e from the multiplier 11c. Therefore, the waveform data of four signals are acquired from the acquisition target positions.

Next, the control unit 110 moves the acquisition target positions to the further preceding side of the positions shown in FIG. 4 by using the partial reconfiguration. In the state shown in FIG. 5 in which the partial reconfiguration is performed, the acquisition target positions are four positions of two inputs to the adder 11*a*, an input to the multiplier 11*c* from the adder 11*a*, and an input to the multiplier 11*c* from the adder 11*b*. Therefore, the waveform data of four signals are acquired from the acquisition target positions.

In the examples shown in FIGS. 3 to 5, the waveform data of signals at 10 positions are acquired by performing the partial reconfiguration and moving the acquisition target positions. In the examples shown in FIGS. 3 to 5, the suspected location in which the error is generated is included in the acquisition target positions in the initial state shown in FIG. 3. Therefore, the partial reconfiguration is performed so as to move the acquisition target positions to the preceding side from the beginning (see FIGS. 3 and 4). In contrast to this, in a case where a location different from the acquisition target positions that are set in the initial state becomes the suspected location, for the first partial reconfiguration, the control unit 110 selects the configuration data such that the acquisition target positions include the suspected location.

Operation of Image Forming Apparatus 100

Figure 6:
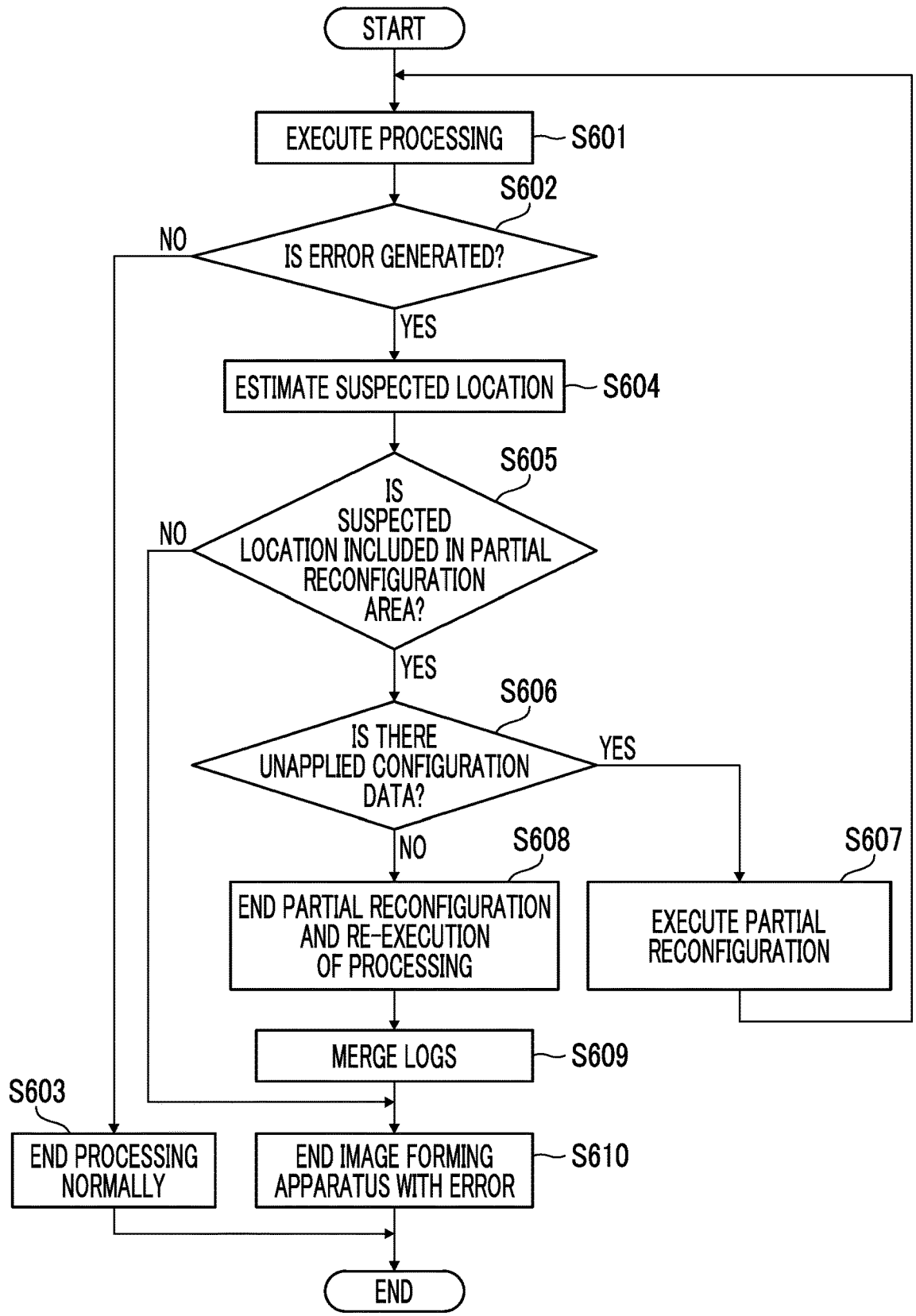
FIG. 6 is a flowchart showing an operation related to the generation of an error in the image forming apparatus.

FIG. 6 is a flowchart showing an operation related to the generation of an error in the image forming apparatus 100. The image forming apparatus 100 receives an execution instruction of the processing such as image formation and executes the instructed processing (S601). Thereafter, in a case where no error is generated (NO in S602), the image forming apparatus 100 ends the processing normally (S603).

In a case where an error is generated in the FPGA device 10 in the processing (YES in S602), the control unit 110 of the image forming apparatus 100 estimates the suspected location based on the generated error (S604). In a case where the suspected location is included in the partial reconfiguration area (YES in S605), next, the control unit 110 determines whether there is the configuration data that is applicable to the partial reconfiguration area but has not yet been applied.

In a case where there is unapplied configuration data (YES in S606), the control unit 110 performs the partial reconfiguration on the FPGA device 10 and changes the acquisition target position (S607). Thereafter, the control unit 110 returns the process to S601 and re-executes the processing in which the error is generated by using the FPGA device 10 where the acquisition target position is changed. In this case, since the cause of the error has not been removed, an error is generated each time the processing is executed, the logs of the waveform data, which are acquired from the acquisition target positions different from each other at the time when the error is generated, are output from the FPGA device 10, and the logs are stored in the storage unit 120.

In a case where the partial reconfiguration is performed for all the configuration data applicable to the partial reconfiguration area that includes the suspected location (NO in S606), the control unit 110 ends the partial reconfiguration of the FPGA device 10 and the re-execution of the processing in which the error is generated (S608). Thereafter, the control unit 110 merges the logs of the waveform data generated at the time when an error is generated, which are stored in the storage unit 120 (S609), and ends the image forming apparatus 100 with an error (S610). In the error processing, the control unit 110 may display a message indicating information related to the generated error on the display unit 140.

In a case where the suspected location of the generated error in the processing is not included in the partial reconfiguration area (NO in S605), even in a case where the partial reconfiguration is performed according to the present exemplary embodiment, the waveform data around the suspected location cannot be increased. Therefore, the control unit 110 ends the image forming apparatus 100 with an error without performing the partial reconfiguration (S610). In the error processing, the control unit 110 may display a message indicating information related to the generated error on the display unit 140.

Although the exemplary embodiments of the present invention have been described above, the technical scope of the exemplary embodiment of the present invention is not limited to the above exemplary embodiment. For example, in the above exemplary embodiment, in the partial reconfiguration, the acquisition target position is moved toward the preceding stage of the processing path from the suspected location. In contrast to this, in a case where the partial reconfiguration is performed using all of the configuration data applicable to the partial reconfiguration area that always includes the suspected location, the order is not limited to the above. In this case, regardless of the position of the suspected location in the partial reconfiguration area, all the configuration data that are applicable to the partial reconfiguration area are applied in a predetermined order to perform the partial reconfiguration.

Further, in the above exemplary embodiment, in a case where the suspected location is not included in the partial reconfiguration area, the partial reconfiguration of the FPGA device 10 and the re-execution of the processing in which the error is generated are not performed. In contrast to this, the partial reconfiguration and the re-execution of the processing in which the error is generated may be performed for the partial reconfiguration area that is positioned in the vicinity of the suspected location as a target. As a result, in the logs at the time when an error is generated, even in a case where the logs are not directly related to the suspected location, since the waveform data in the vicinity of the suspected location increases, there is a possibility that the information for estimating the cause of the error may be obtained.

Further, in the above exemplary embodiment, an example in which the image forming apparatus is used as the information processing apparatus has been described, but the application target of the present exemplary embodiment is not limited to the above example. The present exemplary embodiment can be applied to various information processing apparatuses that use the FPGA devices for at least a part of processors performing data processing, such as a server, a communication apparatus, an automobile, and a game machine. Various changes and alternative configurations that do not deviate from the scope of the technical idea of the exemplary embodiment of the present invention are included in the exemplary embodiment of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an integrated circuit that is capable of reconfiguring a logic circuit, that executes data processing, and that is capable of acquiring signal data from an acquisition target position set in an input and an output of a circuit component where the data processing is performed and outputting the signal data; and
a processor configured to:
change the acquisition target position in the circuit component where the data processing of the integrated circuit is performed in a case where an error is generated in the data processing of the integrated circuit; and
cause the integrated circuit to re-execute the data processing in which the error is generated, after the acquisition target position is changed.

2. The information processing apparatus according to claim 1,
wherein the acquisition target position is set for each one or a plurality of predetermined areas in the integrated circuit and is changed within the area.

3. The information processing apparatus according to claim 2,
wherein the processor is configured to initially set the acquisition target position at a location where the error is generated in the area that includes the location where the error is generated.

4. The information processing apparatus according to claim 3,
wherein the processor is configured to set the acquisition target position at a preceding stage of a position before the change along a flow of data within the area.

5. The information processing apparatus according to claim 1,
wherein the processor is configured to
initially set the acquisition target position at a location where the error is generated, and
set the acquisition target position at a preceding stage of a position before the change along a flow of data in the circuit component where the data processing is performed, after the integrated circuit is caused to re-execute the data processing.

6. The information processing apparatus according to claim 1,
wherein the integrated circuit is capable of reconfiguring only an area set in the logic circuit by reading configuration data of the area, and
the processor is configured to read, out of the configuration data prepared for each of areas, configuration data of an area that includes a location where the error is generated and changes the acquisition target position provided in the area by reconfiguring the area that includes the location where the error is generated.

7. The information processing apparatus according to claim 1,
wherein the processor is configured to re-execute the data processing in which the error is generated from a predetermined operation according to the data processing performed by the integrated circuit.

8. The information processing apparatus according to claim 7,
wherein the data processing that is executed by the integrated circuit is image processing, and
the processor is configured to re-execute processing in which the error is generated for each unit image in an image that is a target of the image processing.

9. An information processing apparatus comprising:
an integrated circuit that is capable of reconfiguring a logic circuit, that executes data processing, and that is capable of acquiring signal data from an acquisition target position set in an input and an output of a circuit component where the data processing is performed and outputting the signal data; and
a processor configured to:
reconfigure, in a case where an error is generated in the data processing of the integrated circuit, the logic circuit of the integrated circuit such that signal data is acquired from a position different from a previous position when the error is generated next time; and
cause the integrated circuit to re-execute the data processing in which the error is generated, after the logic circuit of the integrated circuit is reconfigured.

10. An information processing method comprising:
executing data processing, via an integrated circuit that is capable of reconfiguring a logic circuit, by acquiring signal data from an acquisition target position set in an input and an output of a circuit component where the data processing is performed and outputting the signal data;
changing, by a processor, the acquisition target position in the circuit component where the data processing of the integrated circuit is performed in a case where an error is generated in the data processing of the integrated circuit; and
causing, by the processor, the integrated circuit to re-execute the data processing in which the error is generated, after the acquisition target position is changed.

* * * * *